(12) United States Patent
Shen et al.

(10) Patent No.: US 11,846,784 B2
(45) Date of Patent: Dec. 19, 2023

(54) OPTICAL FIBER LASER COUPLER

(71) Applicant: Wuhan Raycus Fiber Laser Technologies Co., Ltd., Wuhan (CN)

(72) Inventors: Xiang Shen, Wuhan (CN); Dapeng Yan, Wuhan (CN); Rong Li, Wuhan (CN); Qixin Zhu, Wuhan (CN); Zhongya Huang, Wuhan (CN); Jianhong Shi, Wuhan (CN); Lilei Tang, Wuhan (CN); Wenli Zhao, Wuhan (CN); Xing Lei, Wuhan (CN); Cheng Li, Wuhan (CN)

(73) Assignee: Wuhan Raycus Fiber Laser Technologies Co., Ltd., Wuhan (CN)

( * ) Notice: Subject to any disclaimer, the term of this patent is extended or adjusted under 35 U.S.C. 154(b) by 45 days.

(21) Appl. No.: 17/626,797

(22) PCT Filed: Dec. 13, 2019

(86) PCT No.: PCT/CN2019/125246
§ 371 (c)(1),
(2) Date: Jan. 12, 2022

(87) PCT Pub. No.: WO2021/008074
PCT Pub. Date: Jan. 21, 2021

(65) Prior Publication Data
US 2022/0252892 A1    Aug. 11, 2022

(30) Foreign Application Priority Data

Jul. 12, 2019 (CN) .......................... 201910628330.8

(51) Int. Cl.
*G02B 27/09* (2006.01)
*G02B 6/036* (2006.01)
(Continued)

(52) U.S. Cl.
CPC ......... *G02B 27/0955* (2013.01); *G02B 6/002* (2013.01); *G02B 6/036* (2013.01);
(Continued)

(58) Field of Classification Search
None
See application file for complete search history.

(56) References Cited

U.S. PATENT DOCUMENTS

2013/0058124 A1* 3/2013 Park .................... G02B 6/32
362/553

FOREIGN PATENT DOCUMENTS

CN    102934298 A    2/2013
CN    105223661 A    1/2016
(Continued)

OTHER PUBLICATIONS

The International Search Report of the International Searching Authority for PCT Application No. PCT/CN2019/125246 dated Apr. 15, 2020, 7 pages.
(Continued)

*Primary Examiner* — Ashok Patel
(74) *Attorney, Agent, or Firm* — Womble Bond Dickinson (US) LLP

(57) ABSTRACT

An optical fiber laser coupler, comprising a laser input optical cable, a laser shaping and coupling device, and a multi-beam-mode energy transmission fiber (205). The multi-beam-mode energy transmission fiber (205) comprises a circular fiber core (105) and annular fiber cores (106, 107), and each annular fiber core (106, 107) is coaxial with the circular fiber core (105). A fluorine-doped layer (109) is disposed between the circular fiber core (105) and the annular fiber core (106, 107), and the fluorine-doped layer (109) is also disposed between adjacent annular fiber cores (106, 107). An adjustable collimating lens group (203) and
(Continued)

an adjustable focusing lens group (204) of the laser shaping and coupling device can horizontally move along a direction of a laser beam in a housing of the laser shaping and coupling device. The laser shaping and coupling device is configured to couple and input the laser beam input by the laser input optical cable into different fiber cores of the multi-beam-mode energy transmission fiber (205), and obtain output laser beams of different beam modes. The optical fiber laser coupler of the present application can independently implement real-time switching between different beam modes by combining different fiber core structures of the multi-beam-mode energy transmission fiber by means of the laser shaping and coupling device.

10 Claims, 3 Drawing Sheets

(51) Int. Cl.
*G02B 6/32* (2006.01)
*G02B 7/02* (2021.01)
*F21V 8/00* (2006.01)

(52) U.S. Cl.
CPC ............... *G02B 6/32* (2013.01); *G02B 7/023* (2013.01); *G02B 27/0927* (2013.01)

(56) References Cited

FOREIGN PATENT DOCUMENTS

| CN | 108155548 A | 6/2018 |
| CN | 108663745 A | 10/2018 |
| CN | 110320593 A | 10/2019 |
| EP | 0864892 A2 | 9/1998 |

OTHER PUBLICATIONS

The Written Opinion of the International Searching Authority for PCT Application No. PCT/CN2019/125246 dated Apr. 15, 2020, 10 pages.
The International Preliminary Report on Patentability of the Patent Cooperation Treaty for PCT Application No. PCT/CN2019/125246 dated Jan. 18, 2022, 6 pages.

* cited by examiner

OPTICAL FIBER LASER COUPLER

CROSS-REFERENCE TO RELATED APPLICATIONS

The present application is a US national phase application under 35 USC Section 371 of International Application No. PCT/CN2019/125246, filed Dec. 13, 2019, and claims priority to Chinese Application No. 201910628330.8 filed on Jul. 12, 2019, entitled "Optical Fiber Laser Coupler," which was incorporated by reference in its entirety.

FIELD OF TECHNOLOGY

The present application relates to the technical field of optical fiber lasers, in particular to an optical fiber laser coupler.

BACKGROUND

With the gradual increase in the application of optical fiber lasers in civil industry, defense industry, and medical industry, fiber laser technology has developed rapidly in recent years, especially high-power fiber laser devices show unique advantages in the field of industrial processing. Fiber laser devices are thus far widely used for cutting metal sheets, and also show great potential in welding, cladding, and cleaning. In addition, as the application of fiber lasers covers more and more fields, more demands are placed on the diversity of its beam modes.

Currently, most of the commercially available fiber lasers output beams generally with Gaussian modes or Gaussian-like modes, whereas the Gaussian or Gaussian-like beam has a fairly limited application range. As an illustration, Gaussian beams are not suitable for cutting thick plates, while flat-top beams show better thick plate cutting capabilities. Moreover, annular beams show unique advantages when laser drilling is needed. In practical applications, in order to obtain beams of different beam modes, complex spatial optical transformations are required, thus requiring a separate laser for each beam, which greatly increases the cost of use and system complexity. Therefore, the most urgent technical need in this field is to propose a fiber laser device that can not only provide multiple beam modes, but also can be independently switched between different beam modes in real time.

SUMMARY

Embodiments of the present application provide an optical fiber laser coupler that addresses or at least partially addresses the above-mentioned problems.

Embodiments of the present application provide an optical fiber laser coupler, including a laser input optical cable, a laser shaping and coupling device, and a multi-beam-mode energy transmission fiber. The multi-beam-mode energy transmission fiber is a coaxial multi-core fiber including a circular fiber core located at an axial center and at least two annular cores, and each annular fiber core is coaxial with the circular fiber core. A fluorine-doped layer is disposed between the circular fiber core and an adjacent annular fiber core, and another fluorine-doped layer is also disposed between every two adjacent annular fiber cores. An end of the laser input optical cable is connected to a fiber laser device, and the other end thereof is connected to the laser shaping and coupling device. The laser shaping and coupling device includes an adjustable collimating lens group and an adjustable focusing lens group. The adjustable collimating lens group and the adjustable focusing lens group can horizontally move along a direction of a laser beam in a housing of the laser shaping and coupling device. The laser shaping and coupling device is configured to couple and input the laser beam input by the laser input optical cable into different fiber cores of the multi-beam-mode energy transmission fiber, and obtain output laser beams of different beam modes.

In the optical fiber laser coupler provided by the embodiments of the application, the laser beam emitted by the laser device is coupled and input into different cores in the multi-beam-mode energy transmission fiber through a laser shaping and coupling device to obtain laser beams of different beam modes, and thus real-time switching of the output laser beam between different beam modes can be independently implemented; in addition, the optical fiber laser coupler has a relatively simple structure.

BRIEF DESCRIPTION OF THE DRAWINGS

In order to more clearly illustrate technical solutions in the embodiments of the present application or the prior art, drawings needed in the descriptions of the embodiments or the prior art will be briefly described below. Obviously, the drawings in the following description only show some embodiments of the present application, and other drawings can be obtained according to these drawings without any creative work for those skilled in the art.

FIG. 1(*b*) is a schematic diagram showing the structure and refractive index distribution of a multi-beam-mode energy transmission fiber in an optical fiber laser coupler according to an embodiment of the application;

REFERENCE NUMERALS

Figure 1A:
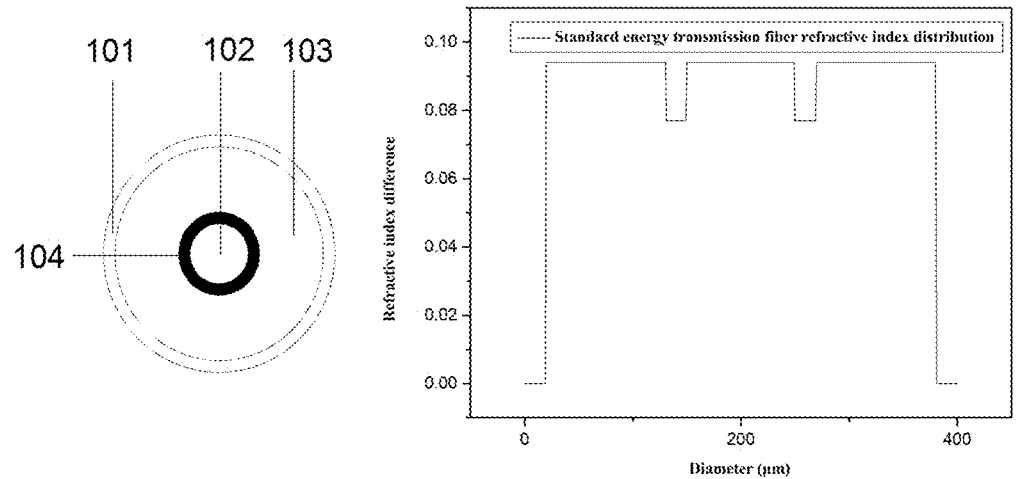
FIG. 1(*a*) is a schematic diagram showing the structure and refractive index distribution of a standard energy transmission fiber in the prior art.

101: standard energy transmission fiber coating layer; 102: standard energy transmission fiber core; 103: standard energy transmission fiber outer cladding layer; 104: standard energy transmission fiber coating fluorine-doped layer; 105: circular core 1 of coaxial three-core fiber; 106: annular core 2 of coaxial three-core fiber; 107: annular core 3 of coaxial three-core fiber; 109: fluorine-doped layer; 108: coaxial three-core fiber coating layer; 201: input fiber; 202: standard energy transmission fiber; 203: adjustable collimating lens group; 204: adjustable focusing lens group; 205: multi-beam-mode energy transmission fiber; 206: double-ended transmission cable; 301: adjusting rod; 302: spring jack bolt; 303: second optical lens barrel; 304: glass slide spring; 305: adjuster housing; 401: beam displacement sheet; 402: electric rotating stepping motor; 601: conical lens pair; 602: Gaussian beam; 603: annular spot 1; 604: annular spot 2; 605: first optical lens barrel; 606: lens spring; 607: stepping motor; 608: adjusting ring.

DETAILED DESCRIPTION

In order to explain the objectives, technical solutions, and advantages of the embodiments of the present application more clearly, the technical solutions in the embodiments of the present application will be clearly described below in conjunction with the drawings in the embodiments of the present application. Obviously, the described embodiments are parts of the embodiments of the present application, rather than all of the embodiments. Based on the embodiments in the present application, all other embodiments obtained by those of ordinary skill in the art without creative work shall fall within the scope of protection of the present application.

At present, the basic structure of a fiber laser device mainly includes two parts, namely a laser body and a laser transmission system. The laser transmission system, also known as the laser transmission cable, mainly includes two parts, i.e., an energy transmission fiber and an output end. In actual use, a laser beam generated by the laser can be directly output through the energy transmission fiber; alternatively, the laser beam can also be input into a shutter or an optical coupler through a laser transmission optical cable, and then input to another laser transmission optical cable for output after being shaped and coupled by the optical coupler. The use of the above-mentioned shutter and optical coupler is intended to facilitate replacing the laser transmission optical cable, so as to output laser beams of different beam modes.

FIG. 1(a) is a schematic diagram showing the structure and refractive index distribution of a standard energy transmission fiber in the prior art. As shown in FIG. 1(a), the standard energy transmission fiber in the prior art consists of a four-layer structure including a core 102 located at the center, an outer cladding layer 103, a coating layer 101, and a fluorine-doped layer 104. The core and the outer cladding layer are made of pure silica, which belong to high refractive index areas, namely laser transmission areas. The material of the fluorine-doped layer 104 is generally fluorine-doped silica, and the fluorine-doped layer and the coating layer are low refractive index areas, which are configured to confine a laser beam to transmit in the core 102 or the outer cladding layer 103. Although the outer cladding layer 103 of the standard energy transmission fiber can be used to transmit the laser beam, it can be known from the refractive index distribution of the standard energy transmission fiber in FIG. 1(a) that the standard energy transmission fiber mainly has the following shortcomings: large output laser beam divergence angle, easy-to-heat coating layer 101, and less supported beam modes.

Figure 1B:
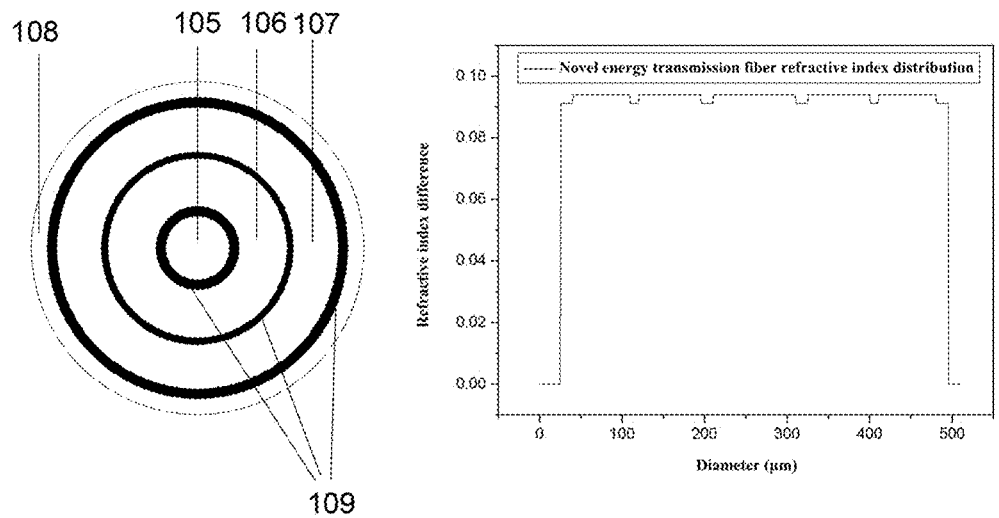
Figure 2:
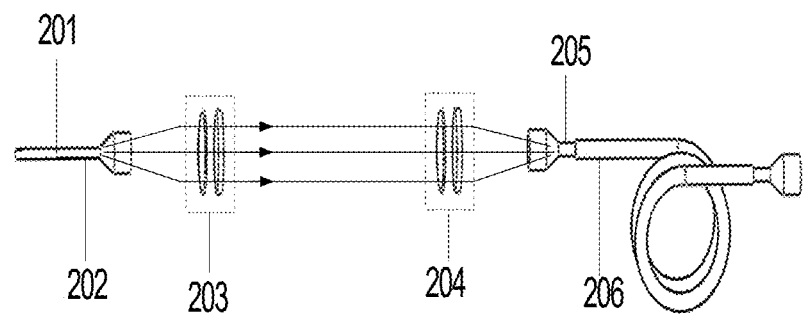
FIG. 2 is a schematic diagram showing the structure of an optical fiber laser coupler according to an embodiment of the application.

As shown in FIG. 1(b) and FIG. 2, the present application provides an optical fiber laser coupler, including a laser input optical cable, a laser shaping and coupling device, and a multi-beam-mode energy transmission fiber 205; the multi-beam-mode energy transmission fiber 205 is a coaxial multi-core fiber including a circular fiber core 105 and at least two annular cores located at an axial center, and each annular fiber core is coaxial with the circular fiber core 105; a fluorine-doped layer 109 is disposed between the circular fiber core 105 and the adjacent annular fiber core, and the fluorine-doped layer 109 is also disposed between every two adjacent annular fiber cores; an end of the laser input optical cable is connected to a laser device, and the other end thereof is connected to the laser shaping and coupling device. The laser shaping and coupling device includes an adjustable collimating lens group 203 and an adjustable focusing lens group 204. The adjustable collimating lens group 203 and the adjustable focusing lens group 204 can horizontally move along a direction of a laser beam in a housing of the laser shaping and coupling device. The laser shaping and coupling device is configured to couple and input a laser beam input by the laser input optical cable into different fiber cores in the multi-beam-mode energy transmission fiber, and obtain output laser beams of different beam modes.

It should be noted that FIG. 1(b) is a schematic diagram showing the structure and refractive index distribution of a multi-beam-mode energy transmission fiber in an optical fiber laser coupler according to an embodiment of the application, specifically a schematic diagram showing the structure and refractive index distribution of a three-core multi-beam-mode energy transmission fiber. For ease of presentation, all embodiments of the present application are described using the three-core multi-beam-mode energy transmission fiber as the multi-beam-mode energy transmission fiber. In the embodiments of the present application, the number of layers of the multi-beam-mode energy transmission fiber is not limited thereto, and at least all the structures of the three-core multi-beam-mode energy transmission fiber are included.

Specifically, the multi-beam-mode energy transmission fiber provided in an embodiment of the present application is a coaxial multi-core fiber, and the circular core 105 is located at the axial center, and the material may be pure silica. As the diameter extends outward, the coaxial multi-core fiber also includes two or more coaxial annular cores, namely the annular core 106 and the annular core 107, the diameter of the annular core 107 is greater than that of the annular core 106. Further, a fluorine-doped layer 109 is disposed between the circular core 105 and the annular core as well as between the annular core 106 and the annular core 107. The material of the fluorine-doped layer may be fluorine-doped silica. Further, more layers of annular cores may be disposed outside the annular core 107, while a fluorine-doped layer is provided between every two adjacent annular cores. A coating layer 108 is further provided on the outer side of the multi-beam-mode energy transmission fiber, and a fluorine-doped layer 109 is further provided between the coating layer 108 and an outermost circular core.

The numerical aperture of the core 102 of the standard energy transmission fiber is generally 0.22, and the numerical aperture of the outer cladding layer 103 is generally 0.46. For the multi-beam-mode energy transmission fiber in the optical fiber laser coupler provided by an embodiment of the application, if a standard energy transmission fiber is used, the numerical aperture of the outer cladding layer is up to 0.46. When the annular laser beam is transmitted in the outer cladding layer, its divergence angle is very likely to exceed 0.2. Laser applications have strict limits on the divergence angle of the output laser, and a great number of laser applications require the divergence angle of the output laser to be less than 0.2. However, an excessive numerical aperture may cause laser power loss and equipment damage. In addition, by reducing the numerical aperture, the divergence angle of the output laser beam can be optimized. Therefore, in the multi-beam-mode energy transmission fiber in the optical fiber laser coupler provided by an embodiment of the application, the numerical apertures of the circular core 105, the annular core 106 and the annular core 107 are reduced, the range of which can be set from 0.1 to 0.22. Wherein, the circular core 105 is configured to transmit a Gaussian beam or a flat-top beam, while the annular core 106 and the annular core 107 are configured to transmit an annular beam.

Further, as shown in FIG. 2, the laser input optical cable includes an input fiber 201 and a standard energy transmission fiber 202, wherein the input fiber 201 is connected to the fiber laser device, and is configured to input the laser beam emitted by the fiber laser device into the laser shaping and coupling device via the standard energy transmission fiber 202.

It should be pointed out that in the embodiments of the present application, the beam mode of the laser beam input by the laser input optical cable is not specifically defined, either a Gaussian or Gaussian-like beam or a flat-top beam may be selected.

Further, in the optical fiber laser coupler provided in an embodiment of the present application, the laser shaping and coupling device includes, but is not limited to an adjustable collimating lens group 203 and an adjustable focusing lens group 204, wherein the adjustable collimating lens 203 is located on a side close to the laser input optical cable, and the adjustable focusing lens 204 is located on a side close to the multi-beam-mode energy transmission fiber. The adjustable collimating lens group 203 and the adjustable focusing lens group 204 can move horizontally along a direction of the laser beam in the housing of the laser shaping and coupling device to enable the adjustment of the laser beam according to actual needs.

In the field of fiber lasers, the coupling of high-power lasers may include spatial coupling and fiber coupling. The coupling mode adopted by the optical fiber laser coupler provided in an embodiment of the present application is spatial coupling. Specifically, after the laser beam is input into the optical fiber laser coupler through the laser input cable, the laser beam is firstly collimated by the adjustable collimating lens group 203, and the collimated laser beam is again focused and coupled into the different cores of the multi-beam-mode energy transmission fiber 205 through the adjustable focusing lens 204, such that the output laser beams of different beam modes are obtained at an output end of the multi-beam-mode energy transmission fiber.

The optical fiber laser coupler provided by an embodiment of the application can couple the laser beam from one circular core to the other circular core, namely enable the output of a circular spot, such as flat-top laser beam, Gaussian or Gauss-like laser beam. Alternatively, the optical fiber laser coupler can couple the laser beam from a circular core to the annular core, enabling the output of an annular laser beam. Furthermore, the laser beam can be simultaneously coupled from a circular core to a circular core and an annular core to enable the simultaneous output of the annular laser beam and the circular laser beam.

Further, the adjustable collimating lens group 203 and the adjustable focusing lens group 204 in the optical fiber laser coupler provided in an embodiment of the present application can move horizontally along a direction of the laser beam in the housing of the laser shaping and coupling device, so that the laser beam can be coupled into different cores of the multi-beam-mode energy transmission fiber 205 on the basis of manual control or automatic control, so as to obtain the output laser beams of different beam modes, and output the laser beams through the double-ended transmission cable 206.

In the optical fiber laser coupler provided by the embodiments of the application, through the laser shaping and coupling device, the received laser beam is collimated and focused into the different cores of the multi-beam-mode energy transmission fiber, and thus real-time switching between different beam modes can be independently implemented; in addition, the optical fiber laser coupler has a relatively simple structure.

Based on the foregoing embodiments, in an optional embodiment, provided is an optical fiber laser coupler, wherein the laser shaping and coupling device further includes a beam shaping system. The beam shaping system is located between the adjustable collimating lens group 203 and the adjustable focusing lens group 204, and is configured to shape a passing Gaussian beam into an annular beam. The Gaussian beam is a beam input by the laser input optical cable, and the laser shaping and coupling device is configured to couple and input the annular beam into different fiber cores in the multi-beam-mode energy transmission fiber 205, and obtain output laser beams of different beam modes.

Figure 3:
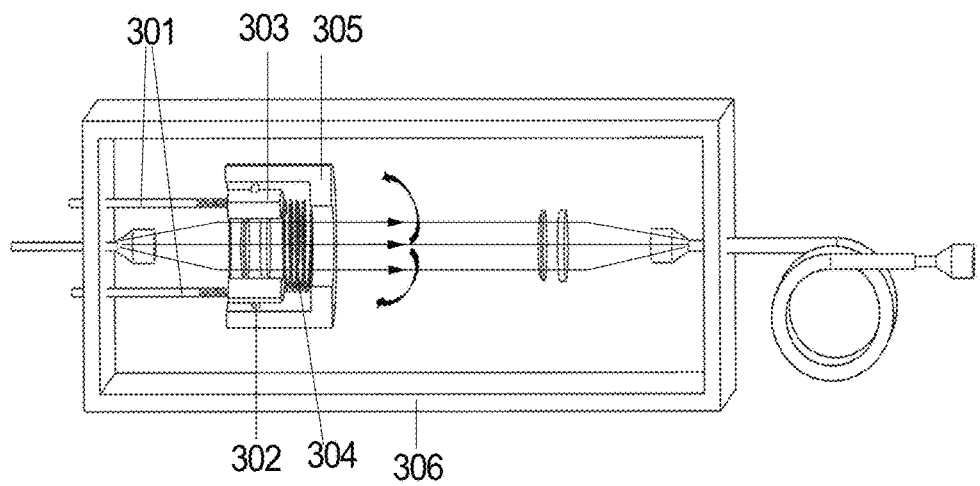
FIG. 3 is a schematic structural diagram of an optical fiber laser coupler according to an embodiment of the application.

Based on the foregoing embodiments, in an optional embodiment, as shown in FIG. 3, the beam shaping system of the optical fiber laser coupler includes a lens group adjusting device, including but not limited to an adjusting rod 301, a second optical lens barrel 303, spring jack bolts 302, a glass slide spring 304, and an adjuster housing 305.

Wherein, the adjuster housing 305 has a hollow cylindrical structure, and the second optical lens barrel 303 and the glass slide spring 304 are encapsulated in the adjuster housing 305; an outer diameter of a spring ring of the glass slide spring 304 is greater than an inner diameter of the second optical lens barrel 303. The adjuster housing 305 is provided with an opening at an end and a slot at the other end, and the adjuster housing 305 is configured to restrict the glass slide spring from passing through. The second optical lens barrel 303 is configured to encapsulate a lens group. The spring jack bolts 302 are symmetrically disposed on an outer wall of the second optical lens barrel 303 and configured to elastically fix the second optical lens barrel 303 in the adjuster housing 305. The adjusting rod 301 is configured to adjust positions of the second optical lens barrel 303 in the adjuster housing 305.

Further, the lens group adjusting device is an independent device which can be disposed outside the adjustable collimating lens group 203, and is configured to adjust the positions of the lenses in the adjustable collimating lens group 203. The lens group adjusting device can also be disposed outside the adjustable focusing lens group 204, and is configured to adjust the positions of the lenses in the adjustable focusing lens group 204. Alternatively, the lens group adjusting devices can be disposed outside both the adjustable collimating lens group 203 and the adjustable focusing lens group 204.

Further, the adjusting rod 301 includes an upper rod and a lower rod, ends of the upper rod and the lower rod are symmetrically disposed on a bottom wall of the second optical lens barrel 303, and the other ends of the upper rod and the lower rod can be movably fixed on a housing 306 of the beam shaping system. The second optical lens barrel 303 can move horizontally when the upper rod and the lower rod are adjusted with equal displacement at the same time, and a pitch angle of the second optical lens barrel 303 is adjusted when the upper rod or the lower rod is adjusted separately.

Specifically, when the upper rod and the lower rod of the adjusting rod 301 are simultaneously pushed, the spring jack bolt 302 is extended, and then the glass slide spring 304 is shortened, thereby driving the second optical lens barrel 303 to move horizontally.

Another operation method is: while adjusting the upper rod and the lower rod of the adjusting rod 301 separately or adjusting the upper rod and the lower rod in a non-equal displacement manner, since the adjuster housing 305 is fixed, the overall pitch angle of the entire second optical lens barrel 303 is changed, so that the coupling angle of the input laser beam will be changed, and the laser beam is coupled into different cores of the multi-beam-mode energy transmission fiber 205 to obtain output laser beams of different beam modes.

Further, it is also possible to precisely control the displacement of the adjusting rod 301 by external driving, so as to achieve more precise adjustment of the coupling angle of the input laser beam. In the embodiment of the present application, the manner of adjusting the displacement of the adjusting rod 301 is not specifically defined.

In the embodiments of the present application, a method and device for adjusting each lens in a laser shaping and coupling device are provided, which enable the coupling of laser beams more simply.

Figure 4:
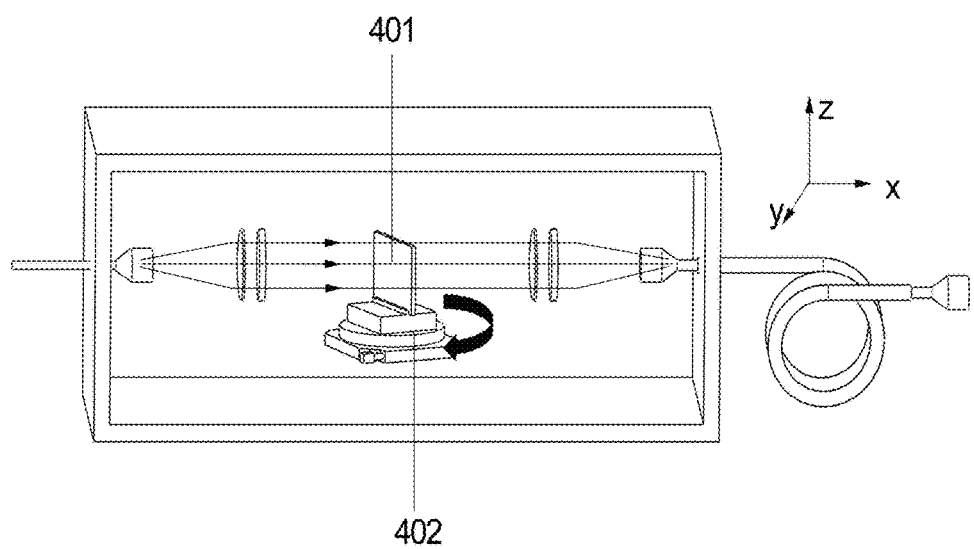
FIG. 4 is a schematic structural diagram of another optical fiber laser coupler according to an embodiment of the application.

Based on the foregoing embodiments, in an optional embodiment, as shown in FIG. 4, provided is an optical fiber laser coupler. The beam shaping system further includes a beam displacement device. The laser beam, after passing through the beam displacement device, is horizontally displaced and input into different fiber cores in the multi-beam-mode energy transmission fiber 205.

Further, the above-mentioned beam displacement device includes but not limited to a beam displacement sheet 401, a fixing base configured to fix the beam displacement sheet, and a driving device configured to drive the fixing base to rotate. The laser beam, after passing through the beam displacement sheet 401, is horizontally displaced and input into different fiber cores in the multi-beam-mode energy transmission fiber 205.

Specifically, the beam displacement sheet 401 of the above-mentioned beam displacement device can be disposed between the adjustable collimating lens group 203 and the adjustable focusing lens group 204, and the beam displacement sheet 401 can be controlled to rotate in the XY plane along the Z axis by a rotating stepping motor 402. When the beam displacement sheet 401 rotates, the laser beam passing through the beam displacement sheet 401 is translated along the Y axis in a direction parallel to the X axis, such that the laser beam is coupled and output into different cores in the multi-beam-mode energy transmission fiber 205 to obtain output laser beams of different beam modes according to actual needs.

In the optical fiber laser coupler provided by the embodiment of the present application, by providing a beam displacement sheet, a laser beam processing method that requires translation for coupling is provided.

Figure 5:
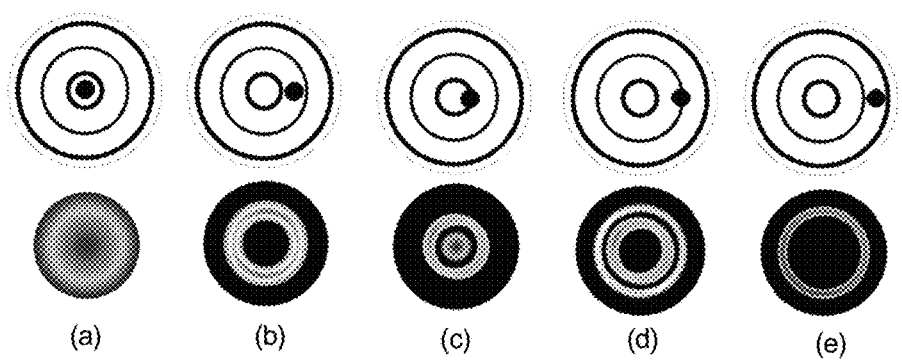
FIG. 5 is a diagram showing beam mode control implemented by coupling a focused circular laser by an optical fiber laser coupler according to an embodiment of the application.

FIG. 5 is a diagram showing beam mode control implemented by coupling a focused circular laser by an optical fiber laser coupler according to an embodiment of the application. When the laser beam is coupled into the circular core 1 of the standard energy transmission fiber or the circular core 105 of the multi-beam-mode energy transmission fiber provided in the present embodiment, an input position of the laser beam and a spot shape of the output laser beam are shown in FIG. 5(a), the output laser beam has a spot shape corresponding to a Gaussian or Gauss-like circular beam. When the laser beam is coupled into the circular core 105 accompanied by a lateral offset, the spot of the output laser beam is a flat top spot.

Further, when the laser beam is only coupled into the annular core of coaxial three-core fiber 106, as shown in FIG. 5(b), the spot of the output laser beam is a small annular spot.

Further, when the coupling of the laser beam simultaneously covers the circular core of coaxial three-core fiber 105, the annular core of coaxial three-core fiber 106 and the fluorine-doped layer 109, the input laser beam will be coupled into the circular core of coaxial three-core fiber 105 and the annular core of coaxial three-core fiber 106 at the same time. As shown in FIG. 5(c), the laser beam output at this point includes a circular laser beam and an annular laser beam, the laser beam mode being a combined beam.

FIG. 5(d) and FIG. 5(e) also show the spot morphology of the output laser beams of different beam modes obtained after being coupled into the different cores of the multi-beam-mode energy transmission fiber 205 in the above-mentioned manner. In the embodiments of the present application, this will not be described in detail.

In the actual test of the optical fiber laser coupler provided by the embodiment of the application described in FIG. 5, the obtained spots of the output laser beams of different beam modes fully proved that the optical fiber laser coupler provided by the embodiment of the application can combine the different core structures of the multi-beam-mode energy transmission fiber through the laser shaping and coupling device, and can independently enable the real-time switching between different beam modes.

Figure 6:
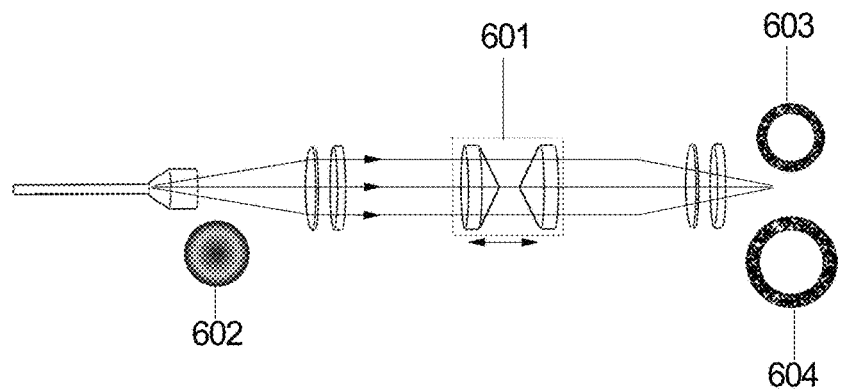
FIG. 6 is a schematic diagram showing an optical path of a laser coupler using a conical lens pair to implement annular beam shaping according to an embodiment of the present application.

FIG. 6 is a schematic diagram showing an optical path of a laser coupler using a conical lens pair to implement annular beam shaping according to an embodiment of the present application. As shown in FIG. 6, on the basis of the foregoing embodiments, in the laser coupler provided by an embodiment of the present application, a beam shaping system is provided between the adjustable collimating lens group 203 and the adjustable focusing lens group 204. The beam shaping system may be a conical lens pair 601, and the conical lens pair 601 includes, but is not limited to, two conical lenses with opposite cone apex angles. In actual laser beam coupling, when the received laser beam is Gaussian or Gauss-like laser beam, both the adjustable collimating lens group 203 and the adjustable focus lens group 204 can be used to directly couple the received laser beam to different cores of the multi-beam-mode energy transmission fiber 205; alternatively, it is possible to use the beam shaping system to shape a Gaussian or Gaussian-like laser beam into an annular laser beam, and then couple the obtained annular laser beam into different cores of the multi-beam mode-energy transmission fiber 205.

Specifically, when the laser beam input by the laser input cable is a Gaussian or Gauss-like laser beam 602, the laser beam is firstly collimated by the adjustable collimating lens group 203; then the conical lens pair 601 can shape the collimated Gaussian or Gaussian-like laser beam into an annular laser beam, the annular laser beam being collimated; and finally the collimated annular laser beam is focused and coupled by the adjustable focusing lens group 204 to different cores in the multi-beam-mode energy transmission fiber to obtain output laser beams of different beam modes.

Further, by controlling the distance between the two lenses of the conical lens pair 601, it is possible to obtain annular laser beams of different diameters. As an illustration, an annular laser beam with a small annular spot 603 or an annular laser beam with a large annular spot 604 can be obtained. The spot thickness of either the annular laser beam with a small annular spot 603 or the annular laser beam with a large annular spot 604 is half the spot diameter of the input laser beam after collimation by the adjustable collimating lens group 203.

In the optical fiber laser coupler provided by the embodiments of the present application, the annular laser beam is coupled by using a beam shaping system, thus the following advantages are provided: on the one hand, in the process of laser beam coupling, due to the fact that the greater the overlap integral between the mode field of the input laser beam and the beam mode field of the target output laser, the greater the coupling efficiency, in the optical fiber laser coupler of the embodiments of the present application, after the annular laser beam is coupled into the coaxial multi-core fiber, the overlap integral with the obtained output laser beams of different beam modes is larger compared with the circular laser beam, thereby improving the beam quality of the final output beam. On the other hand, after the Gaussian laser beam being shaped into an annular laser beam, the increase in the mode field area of the input laser can effectively reduce the energy density, so that during the coupling process, the probability of burning the coupling end of the output fiber is reduced.

Figure 7:
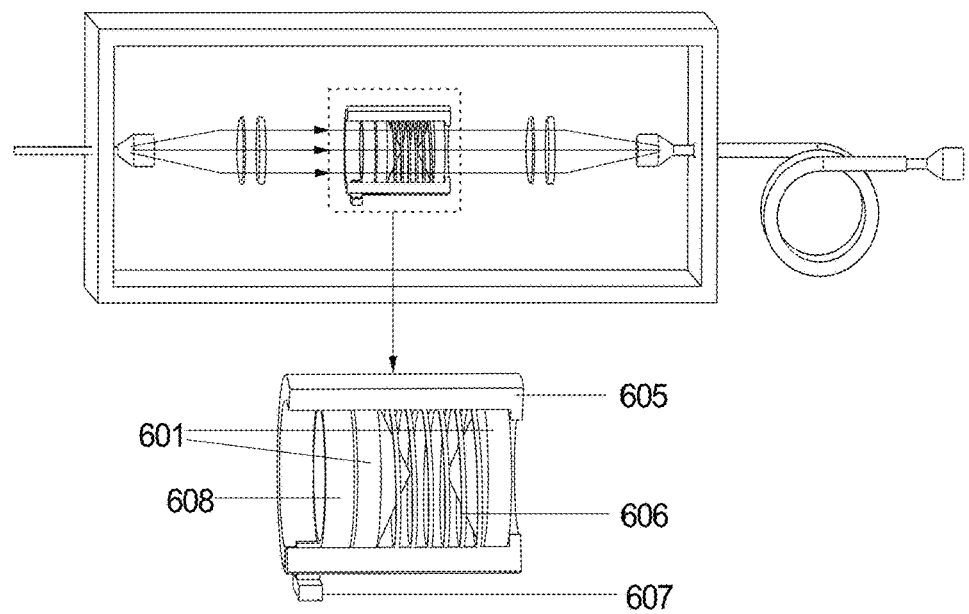
FIG. 7 shows another laser coupler according to an embodiment of the present application.

Based on the foregoing embodiments, in an optional embodiment, as shown in FIG. 7, provided is an optical fiber laser coupler. The beam shaping system further includes a conical lens pair adjusting device. The conical lens pair adjusting device includes, but not limited to a first optical lens barrel 605, a lens spring 606, and an adjusting ring 608. The first optical lens barrel 605 has a hollow cylindrical structure with an opening at an end and a slot at the other end, and is configured to restrict the conical lens pair 601 from passing through. The conical lens pair 601 is encapsulated in the first optical lens barrel 605, and an inner diameter of the first optical lens barrel 605 is slightly larger than an outer diameter of the conical lens pair 601. The lens spring 606 is located between the two conical lenses 601, the adjusting ring 608 is located at an open end of the first optical lens barrel 605, and the adjusting ring 608 and the lens spring 606 are configured to adjust a distance between the two conical lenses in the conical lens pair 601.

Specifically, the adjusting ring 608 can be slid inside the first optical lens barrel 605 manually or by other means, and the adjusting ring 608 further adjusts the distance between the two lenses in the conical lens pair 601 during the moving process.

In an optical fiber laser coupler provided by an embodiment of the present application, by adding a stepping motor 607, the output end of the stepping motor is fixedly connected with the adjusting ring 608, and the forward and backward rotation of the stepping motor 607 corresponds to the forward or backward movement of the adjusting ring 608. It is also possible to drive the adjusting ring 608 to move by a hydraulic device. In this regard, in the embodiments of the present application, the device and method for driving the adjusting ring 608 to move are not specifically defined.

Figure 8:
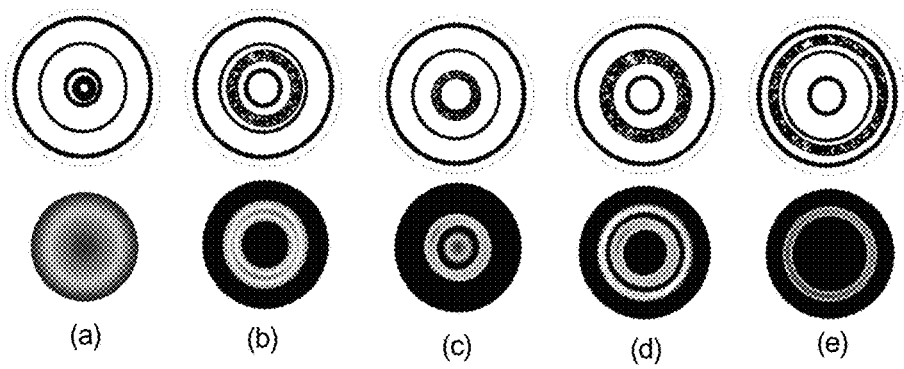
FIG. 8 is a diagram showing beam mode control implemented by coupling a shaped and focused annular laser by an optical fiber laser coupler according to an embodiment of the application.

FIG. 8 is a diagram showing beam mode control implemented by coupling a shaped and focused annular laser by an optical fiber laser coupler according to an embodiment of the application. As shown in FIG. 8, the spots of the output laser beams of different beam modes obtained by the optical fiber laser coupler provided in the embodiments of the present application in actual tests fully prove that the optical fiber laser coupler provided in the embodiments of the present application can combine the different core structures of the multi-beam-mode energy transmission fiber through the laser shaping and coupling device, and can independently enable the real-time switching between different beam modes.

In the optical fiber laser coupler provided by the embodiments of the present application, by providing the beam shaping system, the distance between the two conical lenses in the conical lens pair is adjusted to obtain annular laser beams of different diameters, thereby providing convenience for the laser shaping and coupling device to input the annular laser beams of different diameters into the different cores of the multi-beam-mode energy transmission fiber.

Finally, it should be noted that all the embodiments above are only used to explain the technical solutions of the present application, and are not limited thereto. Although the present application has been described in detail with reference to the foregoing embodiments, it should be understood that those skilled in the art can still modify the technical solutions recorded in the foregoing embodiments and make equivalent substitutions to a part of the technical features, and these modifications and substitutions do not make the essence of the corresponding technical solutions depart from the scope of the technical solutions of various embodiments of the present application.

What is claimed is:

1. An optical fiber laser coupler, comprising a laser input optical cable, a laser shaping and coupling device, and a multi-beam-mode energy transmission fiber; wherein
   the multi-beam-mode energy transmission fiber is a coaxial multi-core fiber and the multi-beam-mode energy transmission fiber comprises a circular fiber core located at an axial center and at least two annular cores, and each annular fiber core is coaxial with the circular fiber core; wherein a fluorine-doped layer is disposed between the circular fiber core and an adjacent annular fiber core, and another fluorine-doped layer is disposed between every two adjacent annular fiber cores;
   an end of the laser input optical cable is connected to a fiber laser device, and the other end of the laser input optical cable is connected to the laser shaping and coupling device; and
   the laser shaping and coupling device comprises an adjustable collimating lens group and an adjustable focusing lens group; the adjustable collimating lens group and the adjustable focusing lens group are able to horizontally move along a direction of a laser beam in a housing of the laser shaping and coupling device; and the laser shaping and coupling device is configured to couple and input the laser beam by the laser input optical cable into different fiber cores of the multi-beam-mode energy transmission fiber, so as to obtain output laser beams with different beam modes.

2. The optical fiber laser coupler of claim 1, wherein
   the laser shaping and coupling device further comprises a beam shaping system;
   the beam shaping system is located between the adjustable collimating lens group and the adjustable focusing lens group, and is configured to shape a Gaussian beam into an annular beam; and
   the Gaussian beam is a beam input by the laser input optical cable, and the laser shaping and coupling device is configured to couple and input the annular beam into the different fiber cores in the multi-beam-mode energy transmission fiber, so as to obtain output laser beams with different beam modes.

3. The optical fiber laser coupler of claim 2, wherein the beam shaping system comprises a conical lens pair, and the conical lens pair comprises two conical lenses with opposite cone apex angles.

4. The optical fiber laser coupler of claim 3, wherein the beam shaping system further comprises a conical lens pair adjusting device;

the conical lens pair adjusting device comprises a first optical lens barrel, a lens spring, and an adjusting ring; the first optical lens barrel has a hollow cylindrical structure with an opening at an end and a slot at the other end, and the slot is configured to restrict the conical lens pair from passing through; the conical lens pair is encapsulated in the first optical lens barrel, and an inner diameter of the first optical lens barrel is slightly larger than an outer diameter of the conical lens pair; the lens spring is located between the two conical lenses, the adjusting ring is located at an open end of the first optical lens barrel, and the adjusting ring and the lens spring are configured to adjust a distance between the two conical lenses in the conical lens pair.

5. The optical fiber laser coupler of claim 4, the beam shaping system further comprises a stepping motor configured to drive the adjusting ring to translate along an axial direction of the first optical lens barrel.

6. The optical fiber laser coupler of claim 5, wherein the beam shaping system further comprises a lens group adjusting device;

wherein the lens group adjusting device comprises an adjusting rod, a second optical lens barrel, spring jack bolts, a glass slide spring, and an adjuster housing;

the adjuster housing has a hollow cylindrical structure, and the second optical lens barrel and the glass slide spring are encapsulated in the adjuster housing; an outer diameter of a spring ring of the glass slide spring is greater than an inner diameter of the second optical lens barrel; the adjuster housing is provided with an opening at an end and a slot at the other end, and the slot is configured to restrict the glass slide spring from passing through; the second optical lens barrel is configured to encapsulate a lens group, the spring jack bolts are symmetrically disposed on an outer wall of the second optical lens barrel and are configured to elastically fix the second optical lens barrel in the adjuster housing; the adjusting rod is configured to adjust positions of the second optical lens barrel in the adjuster housing.

7. The optical fiber laser coupler of claim 6, wherein the adjusting rod comprises an upper rod and a lower rod, ends of the upper rod and the lower rod are symmetrically disposed on a bottom wall of the second optical lens barrel, and the other ends of the upper rod and the lower rod can be movably fixed on a housing of the beam shaping system; the second optical lens barrel can move horizontally when the upper rod and the lower rod are adjusted with equal displacement at the same time, and a pitch angle of the second optical lens barrel is adjusted when the upper rod or the lower rod is adjusted separately.

8. The optical fiber laser coupler of claim 7, wherein the lens group adjusting device is configured to adjust the adjustable collimating lens group and the adjustable focusing lens group.

9. The optical fiber laser coupler of claim 7, wherein the beam shaping system further comprises a beam displacement device; and wherein the laser beam, after passing through the beam displacement device, is horizontally displaced and input into the different fiber cores in the multi-beam-mode energy transmission fiber.

10. The optical fiber laser coupler of claim 9, wherein the beam displacement device comprises a beam displacement sheet, a fixing base configured to fix the beam displacement sheet, and a driving device configured to drive the fixing base to rotate; and wherein the laser beam, after passing through the beam displacement sheet, is horizontally displaced and input into the different fiber cores in the multi-beam-mode energy transmission fiber.

\* \* \* \* \*